UNITED STATES PATENT OFFICE.

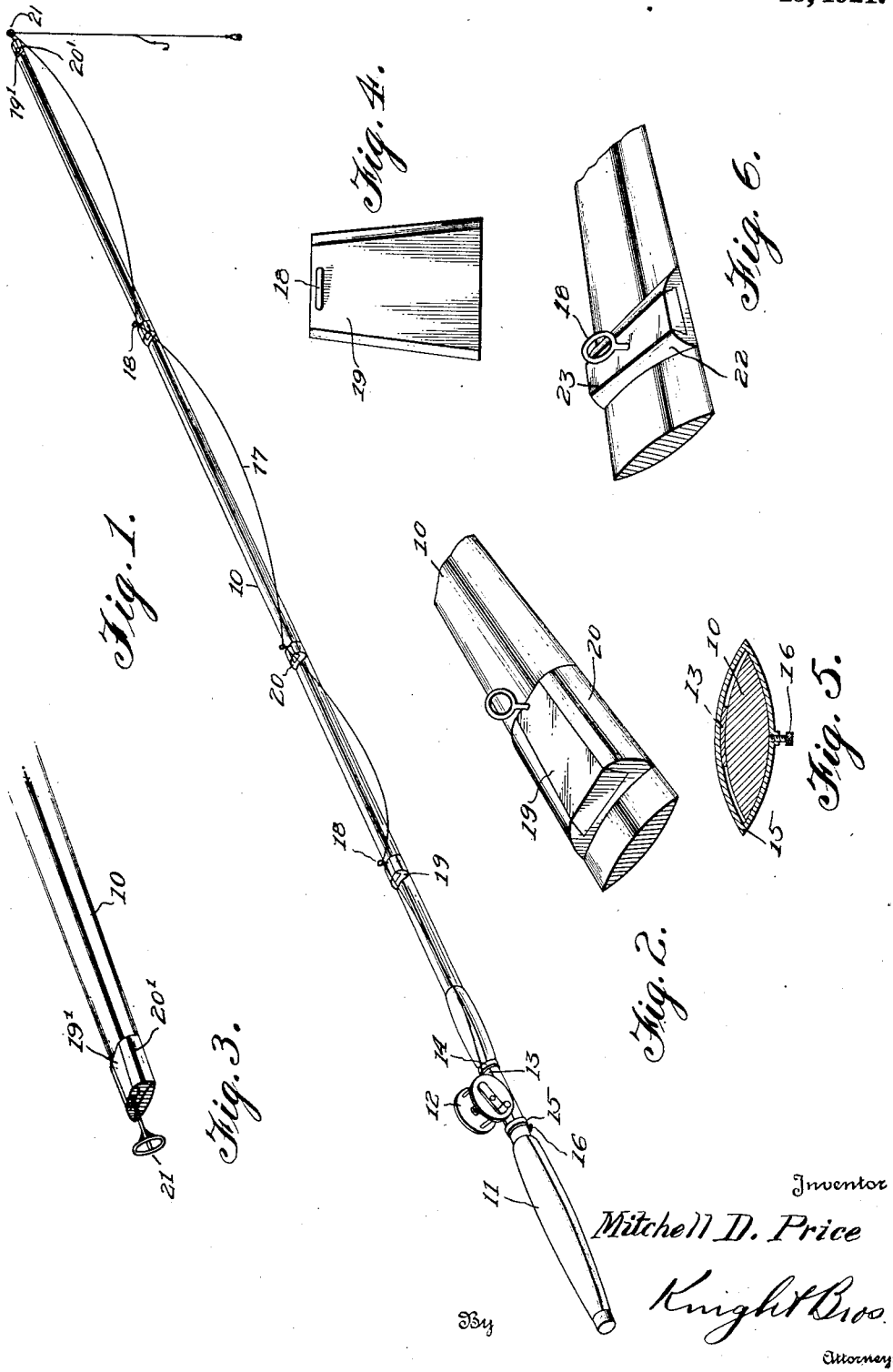

MITCHELL D. PRICE, OF MIAMI, FLORIDA.

FISHING-ROD.

1,371,261.  Specification of Letters Patent.  Patented Mar. 15, 1921.

Application filed August 23, 1920. Serial No. 405,263.

*To all whom it may concern:*

Be it known that I, MITCHELL D. PRICE, a citizen of the United States, and resident of Miami, in the county of Dade and State of Florida, have invented certain new and useful Improvements in Fishing-Rods, of which the following is a specification.

My invention relates to fishing rods, and more particularly to rods formed in one piece and of steel.

One of the objects of my invention is to provide a rod which will be of a light weight and at the same time strong and durable.

Another feature of my invention resides in the manner in which I secure to the rod the line guides. In a rod constructed in accordance with my invention, the guides through which the line passes are removable and may be replaced when the same become mutilated or damaged, thereby lengthening the life of the rod, as it is generally understood that the guides are the first parts of a fishing rod to wear out.

Certain other advantages and features will be made more apparent in the accompanying specification and in the drawings, in which—

Figure 1 is a perspective view of a rod constructed in accordance with my invention;

Fig. 2 is a fragmentary perspective view of a section of the rod, showing in detail one of the line guides and holder therefor;

Fig. 3 is a perspective view of one end of the rod;

Fig. 4 is a top plan view of the guide carrier;

Fig. 5 is a transverse section of the rod, showing a portion of the reel-securing means; and Fig. 6 discloses a modified form of the line guide securing means.

In the drawings the numeral 10 represents my improved rod, which, as illustrated, is formed of a solid piece of steel. In cross-section the rod is substantially an elongated or flattened oval, as illustrated quite clearly in the several figures. The rod is provided with the usual handle 11, which, however, may be round to more conveniently accommodate the hand of the fisherman. A reel 12, of any ordinary construction, is mounted upon the rod by means of a longitudinal strap member 13 rigidly secured to the reel, which strap member is held to the rod by bands 14 and 15. The band 14 may be stationary, while the band 15 is slidable to provide for disengagement with the strap 13 and removal of the reel. The movable band 15 is held in place by a set screw 16, which bites into the rod 10.

The fishing line is indicated by 17, and is adapted to pass through guides of any ordinary construction, such as 18, along the rod length. These line guides are mounted upon guide bases or supports 19. The guide bases are wedge-shaped, and are also tapered vertically from the bottom to the top thereof. Sockets 20 for receiving these guide bases are welded, or secured in any other suitable manner, to the top or horizontal face of the rod, as clearly illustrated in Fig. 1. These sockets are suitably recessed to receive the bases 19. It is obvious, therefore, that with the sockets 20 permanently attached to the rod, the bases 19 carrying the guides 18 may be slipped into the socket members and rigidly held in place by reason of the wedge-like shape of the base member and socket.

A guide of the type usually employed at the end of the rod is here indicated by the numeral 21, and is carried by a guide base 19', which base is held in place by the socket 20'. It is apparent that the base and socket members may easily be adapted for supporting the end line guide 21. The tip of the rod may also be rounded and the usual tip affixed thereto in the usual manner.

Referring now more particularly to Fig. 6, it will be seen that I have illustrated a slightly different form of guide base and socket. In this figure the socket 22 is positioned transversely of the rod and is recessed to receive the guide base 23, which is wedge-shaped and tapered vertically, similar to the guide base 19. The usual line guide 18 is carried by the base 23.

I have found that a rod constructed in accordance with my invention embodies the advantages of light weight with strength and durability. By forming the rod of a solid piece of steel, with an elongated or flattened oval cross-section, I am enabled to secure the proper rigidity and strength, and retain the minimum weight of the rod.

The horizontal top face of the rod also provides suitable space for socket members, which, as hereinbefore stated, may be welded to the rod or secured thereto in any other suitable manner. The wedge-shaped bases which carry the line guides may be quickly and easily slipped into the socket members, and when forced into position will be retained in place by reason of the wedge shape of the base and socket members. Therefore, when any of the line guides become mutilated or broken, the particular base upon which the mutilated guide member is mounted may be removed and replaced by a new one. The rod tapers from the handle to the end carrying the guide 21, as in fishing rods of the usual construction.

It should also be understood that, while I have illustrated the rod of a rounded or smooth cross-sectional shape, I may form the rod with a cross-sectional shape having six, eight or ten or any number of sides, that would approximate in cross-sectional shape and design, and oval.

Having thus described my invention, what I claim is:

1. The combination with a steel fishing rod of substantially oval cross-sectional shape, of removable line guides, socket members rigidly mounted upon said rod and provided with grooved faces, tapered bases carrying said line guides and shaped to fit said grooves, as and for the purpose set forth.

2. A fishing rod, socket members secured to said rod, line guides, vertically and longitudinally tapered bases carrying said guides, said socket members being adapted to receive said guide bases to removably secure the same upon said rod, substantially as described.

3. A fishing rod formed of steel, with a substantially elongated oval-shaped cross-section, a reel and fishing line, socket members secured to said rod, guides for said fishing line, wedge-shaped bases carrying said guides, said sockets adapted to receive said guide bases to mount said guides upon the rod, substantially as described.

MITCHELL D. PRICE.